US008622800B2

(12) United States Patent
Nelson et al.

(10) Patent No.: US 8,622,800 B2
(45) Date of Patent: Jan. 7, 2014

(54) SYSTEM AND METHOD OF PROVIDING AN INSTANT BONUS FOR A GAMING APPARATUS

(75) Inventors: Dwayne Nelson, Las Vegas, NV (US); David Haag, Las Vegas, NV (US); Steven LeMay, Reno, NV (US)

(73) Assignee: IGT, Reno, NV (US)

( * ) Notice: Subject to any disclaimer, the term of this patent is extended or adjusted under 35 U.S.C. 154(b) by 1008 days.

(21) Appl. No.: 10/481,050

(22) PCT Filed: Mar. 28, 2002

(86) PCT No.: PCT/US02/11195
§ 371 (c)(1), (2), (4) Date: Dec. 16, 2003

(87) PCT Pub. No.: WO03/083789
PCT Pub. Date: Oct. 9, 2003

(65) Prior Publication Data

US 2005/0026669 A1 Feb. 3, 2005

(51) Int. Cl.
*A63F 13/00* (2006.01)

(52) U.S. Cl.
USPC .................... 463/16; 463/20; 463/21; 463/25

(58) Field of Classification Search
USPC .............................. 463/16, 20, 21, 25, 30–33
See application file for complete search history.

(56) References Cited

U.S. PATENT DOCUMENTS 5,664,998 A 9/1997 Seeling et al. .................. 463/20
5,830,069 A 11/1998 Soltesz et al.
6,110,043 A * 8/2000 Olsen .............................. 463/27
6,210,275 B1 * 4/2001 Olsen .............................. 463/16
6,224,484 B1 5/2001 Okuda et al. ..................... 463/27
6,231,445 B1 * 5/2001 Acres .............................. 463/42
6,368,216 B1 4/2002 Hedrick et al.
6,506,118 B1 1/2003 Baerlocher et al. ............. 463/25
6,533,273 B2 * 3/2003 Cole et al. .................. 273/138.1

(Continued)

FOREIGN PATENT DOCUMENTS

AU 755826 2/1999
GB 2106685 4/1983

OTHER PUBLICATIONS

International Search Report for Application No. PCT/US02/11195 dated Dec. 20 2002.

*Primary Examiner* — Ronald Laneau
*Assistant Examiner* — Ross Williams
(74) *Attorney, Agent, or Firm* — Griffiths & Seaton PLLC

(57) ABSTRACT

A gaming method that includes causing a first video image to be generated, wherein the first video image represents a first game selected from the group of first games consisting of video poker, video blackjack, video slots, video keno and video bingo. The method further includes causing a second video image to be generated, wherein said second video image represents an instant bonus game. The method also includes providing said instant bonus game to a player without requiring play of said first game and evaluating a first outcome of said first game when said first game is selected by said player. The method also includes evaluating a second outcome of said instant bonus game when said instant bonus game is selected by said player and determining a first value payout associated with said first outcome of said first game when said first game is selected by said player, and determining a second value payout associated with said instant bonus game when said instant bonus game is selected by said player.

20 Claims, 13 Drawing Sheets

(56) References Cited

U.S. PATENT DOCUMENTS

| | | | | |
|---|---|---|---|---|
| 6,565,436 | B1 | 5/2003 | Baerlocher | 463/26 |
| 6,620,046 | B2 | 9/2003 | Rowe | 463/25 |
| 6,645,073 | B2 | 11/2003 | Lemay et al. | 463/20 |
| 6,837,793 | B2 * | 1/2005 | McClintic | 463/42 |
| 2001/0054794 | A1 * | 12/2001 | Cole et al. | 273/138.1 |
| 2002/0119818 | A1 | 8/2002 | Savio et al. | |
| 2003/0119573 | A1 | 6/2003 | McClintic | |

* cited by examiner

FIG. 10
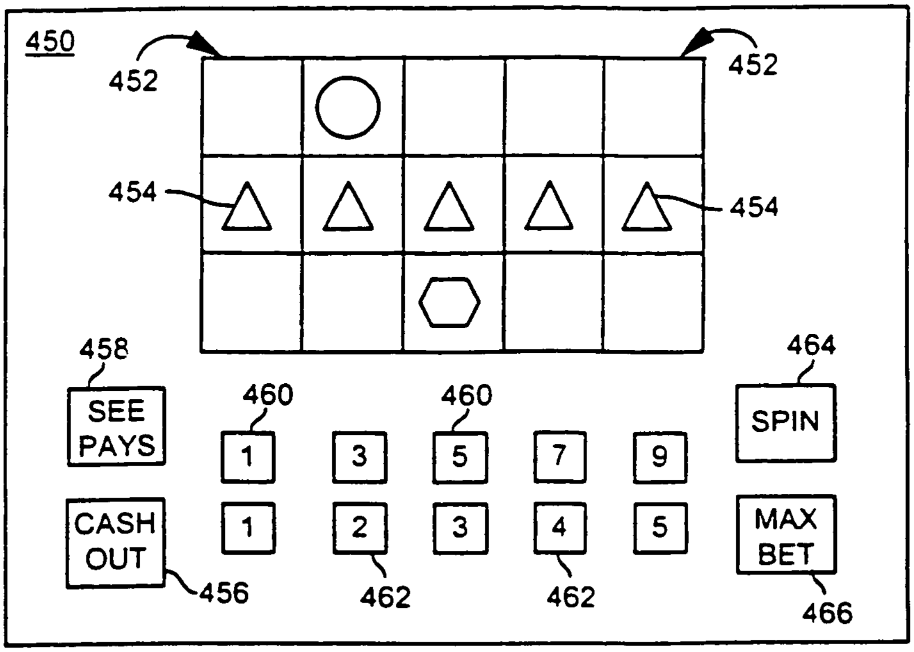
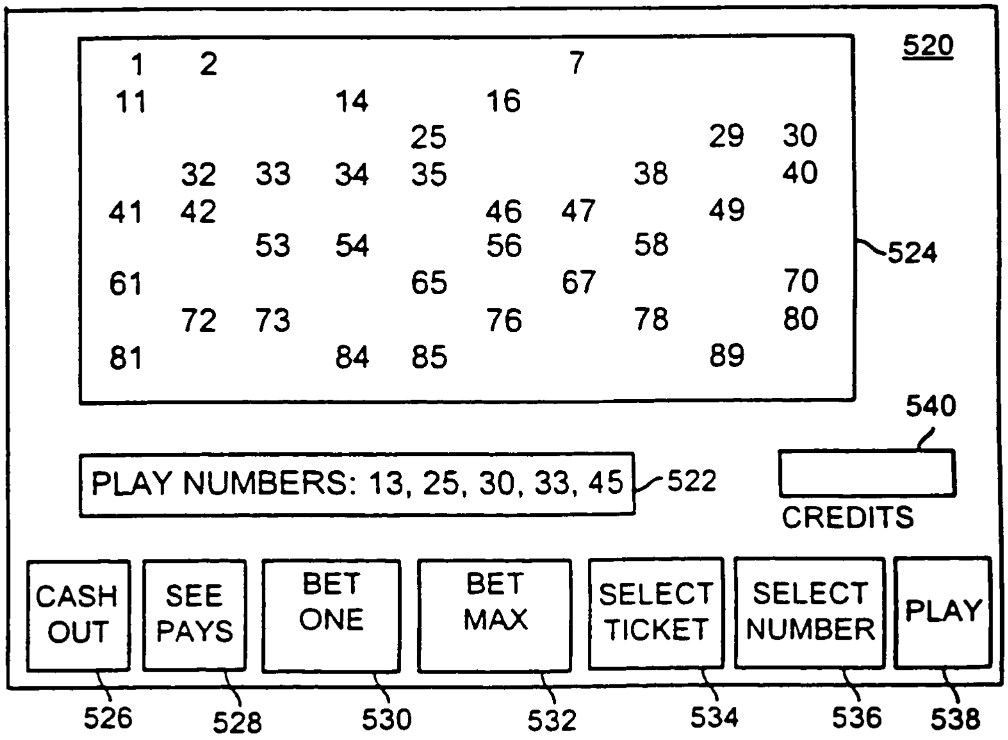
FIG. 11

SYSTEM AND METHOD OF PROVIDING AN INSTANT BONUS FOR A GAMING APPARATUS

BACKGROUND OF THE INVENTION

Conventional gaming apparatuses (including lottery apparatuses) and gaming systems offer a variety of bonus game features and large jackpot payouts. Most gaming system bonus wins fall into two basic categories. A first category is the large progressive jackpot. The large progressive jackpot occurs at a random time so the player has no idea of when the jackpot will hit.

A second category of gaming system bonus wins is a bonus game in which the player is aware of an approaching bonus game. Here, all players have some type of indication that a bonus is coming and only one player will win the bonus amount. The second category or type of bonus was designed to encourage players to play more as the expected bonus game plays. The problem with this type of bonus is that some players sit around and wait for the bonus game to hit and them jump in and try to win the bonus. Casino operators, or any other facilities having gaming apparatuses, do not like this because the unaware tourist leaves a loser and the savvy local player takes the winnings. Additionally, conventional gaming apparatuses require players to play and win an underlying first game before the bonus game is even offered to the player. Thus it is very difficult to ever reach a bonus game.

SUMMARY OF THE INVENTION

In accordance with a first aspect of the invention, a gaming apparatus is provided that comprises a display unit that is capable of generating video images, a value input device, and a controller. The controller may be operatively coupled to the display unit and the value input device. The controller may comprise a processor and a memory operatively coupled to the processor. The controller may be programmed to cause a first video image to be generated on the display unit. The first video image may represent a game selected from the group of games consisting of video poker, video blackjack, video slots, video keno, video bingo, other video card games, and video pachinko. The video image may comprise an image of at least five playing cards if the first game comprises video poker. The first video image may comprise an image of a plurality of simulated slot machine reels if the first game comprises video slots. If the first game comprises video blackjack, the first video image may comprise an image of a plurality of playing cards. Also, the first video image may comprise an image of a plurality of keno numbers if the first game comprises video keno, and the first video image may comprise an image of a bingo grid if the first game comprises video bingo.

In addition, the memory operatively coupled to the controller may be adapted to store a second video image for display on the display unit, wherein the second video image represents a second game comprising an instant bonus game. The controller may also be programmed to allow the instant bonus game to be played by a player without requiring play of the first game. Additionally, the memory operatively coupled to the controller is adapted to store data representing a value payout associated with the instant bonus game after the instant bonus game is played by the player. The data may be transmitted to the controller from a network computer.

The memory for the gaming apparatus may also store data representing a minimum jackpot value for the instant bonus game. Additionally, the memory may store data representing a buy-in amount for the instant bonus game. The controller may be programmed to notify the player when the instant bonus game will begin. Also, a gaming system may be provided comprising a plurality of gaming apparatuses as defined above, wherein said gaming apparatuses are interconnected to form a network of gaming apparatuses. These gaming apparatuses may be interconnected via the Internet, a serial network, an ethernet network, a firewire based network, other LAN, WAN, internet or intranet networks. The gaming system may provide the instant bonus game described above on the plurality of gaming apparatuses to allow a plurality of players to compete for the value payout of the instant bonus game. The payout of the instant bonus games on the apparatuses in the gaming system may comprise a percentage of a plurality of buy-in amounts collected from the plurality of players playing the instant bonus game.

In accordance with a second aspect of the invention, a gaming apparatus comprising a first display unit that is capable of generating video images and a value input device may be provided. The gaming apparatus may also include a controller that is operatively coupled to the first display unit and the value input device. The controller may comprise a processor and a memory operatively coupled to the processor. The controller may be programmed to allow a person to make a wager and to cause a first video image to be generated on the first display unit, wherein the first video image represents a first game. In addition, the controller may be programmed to cause a second video image to be generated on a second display unit after each completion of the first game. The second video image may represent an instant bonus game. In addition, the memory of the controller may store data to represent a value payout associated with an outcome of the instant bonus game.

In accordance with a third aspect of the invention, a gaming apparatus is provided comprising a display unit that is capable of generating video images, and a value input device. The gaming apparatus may also include a controller that is operatively coupled to the display unit and the value input device. The controller may comprise a processor and a memory operatively coupled to the processor. The controller may be programmed to allow a person to make a wager. Additionally, the controller may be programmed to cause a first video image to be generated on the display unit wherein the first video image represents a first game selected from the group of games consisting of video poker, video blackjack, video slots, video keno, and video bingo. The first video image may comprise an image of at least five playing cards if the first game comprises video poker. The first video image may comprise an image of a plurality of simulated slot machine reels if the first game comprises video slots. Also, the first video game may comprise the image of a plurality of playing cards if the first game comprises video blackjack. Additionally, the first video image may comprise an image of a plurality of keno numbers if the first game comprises video keno. The first video image may also comprise an image of a bingo grid if the first game comprises video bingo.

The memory operatively coupled to the controller associated with the gaming apparatus may be adapted to store a second video image to be generated on the display unit, wherein the second video image is displayed after each completion of the first game. The second video image may represent a second game comprising an instant bonus game. Also, the controller may be programmed to allow the instant bonus game to be played by a player after a buy-in value is received from the player. The memory operatively coupled to the controller may be further adapted to store data representing the value payout associated with the instant bonus game.

In accordance with a fourth aspect of the invention, a gaming apparatus is provided comprising a display unit that is capable of generating video images, a value input device, and a controller. The controller may be operatively coupled to the display unit and the value input device. The controller may comprise a processor and a memory operably coupled to the processor and may be programmed to allow a person to make a wager and to make a payline selection. In addition, the controller may be programmed to cause a first video image to be generated on the display unit, wherein the first video image may comprise a plurality of simulated slot machine reels of a slot machine. The slot machine reels may have a plurality of slot machine symbols. Additionally, the memory of the controller may store a second video image that represents an instant bonus game. The gaming apparatus' controller may further be programmed to allow the instant bonus game to be played by a player without requiring play of the slots game. Also, the memory of the controller may store data representing a value payout associated with an outcome of the instant bonus game.

In accordance with a fifth aspect of the invention, a gaming method may be provided that may comprise causing a first video image to be generated, wherein the first video image represents a first game selected from the group of games consisting of video poker, video blackjack, video slots, video keno, video bingo, other video card games, and video pachinko.

The first video image may comprise an image of at least five playing cards if the first game comprises video poker. Also, the first video image may comprise an image of a plurality of simulated slot machine reels if the first game comprises video slots. Additionally, the first video image may comprise an image of a plurality of playing cards if the first game comprises video blackjack. The first video image may also comprise an image of a plurality of keno numbers if the first game comprises video keno. Also, the first video image may comprise an image of a bingo grid if the first game comprises video bingo.

The gaming method may also comprise causing a second video image of a second game to be generated, wherein the second game comprises an instant bonus game. The gaming method may further comprise allowing the instant bonus game to be played without requiring play of the first game. Additionally, the gaming method may include determining a value payout associated with the instant bonus game after the instant bonus game is played by the player. As an alternative to allowing the instant bonus game to be played without requiring play of the first game, the gaming method may alternatively comprise causing a second video image of a second game to be generated after each completion of the first game, wherein the second game comprises an instant bonus game.

In accordance with a sixth aspect of the invention, a memory may be provided, wherein the memory has a computer program stored therein that is capable of being used in connection with the gaming apparatus. The memory may comprise a first memory portion physically configured in accordance with computer program instructions that would cause the gaming apparatus to allow a person to make a wager. Additionally, the memory may include a second memory portion physically configured in accordance with computer program instructions that would cause the gaming apparatus to cause a first video image to be generated on a display unit wherein the first video image would represent a first game selected from the group of first games consisting of video poker, video blackjack, video slots, video keno, and video bingo. A third memory portion may also be included in the memory that is physically configured in accordance with computer program instructions that would cause a second video image to be generated on the display unit, wherein the second video image represents an instant bonus game.

The memory may also comprise a fourth memory portion physically configured in accordance with computer programs instructions that would cause the gaming apparatus to allow the instant bonus game to be played without requiring play of the first game. The memory may also comprise a fifth memory portion physically configured in accordance with computer program instructions that would determine a value payout associated with the instant bonus game after the instant bonus game is played.

In accordance with a seventh aspect of the invention, a slot machine may be provided that includes a housing, a transparent display portion associated with the housing, a value input device, and a plurality of mechanically rotatable reels. The mechanically rotatable reels may have a plurality of slot machine symbols formed thereon. Furthermore, the mechanically rotatable reels may be disposed in the housing so that the slot machine symbols are visible to a player through the transparent display portion. The slot machine may also have a display unit that is capable of generating video images, wherein the controller is operatively coupled to the mechanically rotatable reels, the display unit, and the value input device. The controller may comprise a processor and a memory operatively coupled to the processor. The controller may be programmed to determine a value payout associated with an outcome of a slots game, wherein the controller is programmed to determine the outcome of the slots game based on a configuration of the slot machine symbols.

The memory for the controller may be adapted to store a video image for display on the display unit, and wherein the video image represents an instant bonus game. The controller may be programmed to allow the instant bonus game to be played by a player without requiring play of the slots game and the memory for the controller may be adapted to store data representing a value payout associated with the instant bonus game.

The features and advantages of the present invention will be apparent to those of ordinary skill in the art in view of the detailed description of various embodiments, which is made with reference to the drawings, a brief description of which is provided below.

BRIEF DESCRIPTION OF THE DRAWINGS

FIG. 10 is an illustration of an embodiment of a visual display that may be displayed during performance of the slots routine of FIG. 12;

FIG. 11 is an illustration of an embodiment of a visual display that may be displayed during performance of the video keno routine of FIG. 13;

DETAILED DESCRIPTION OF VARIOUS EMBODIMENTS

Figure 1:
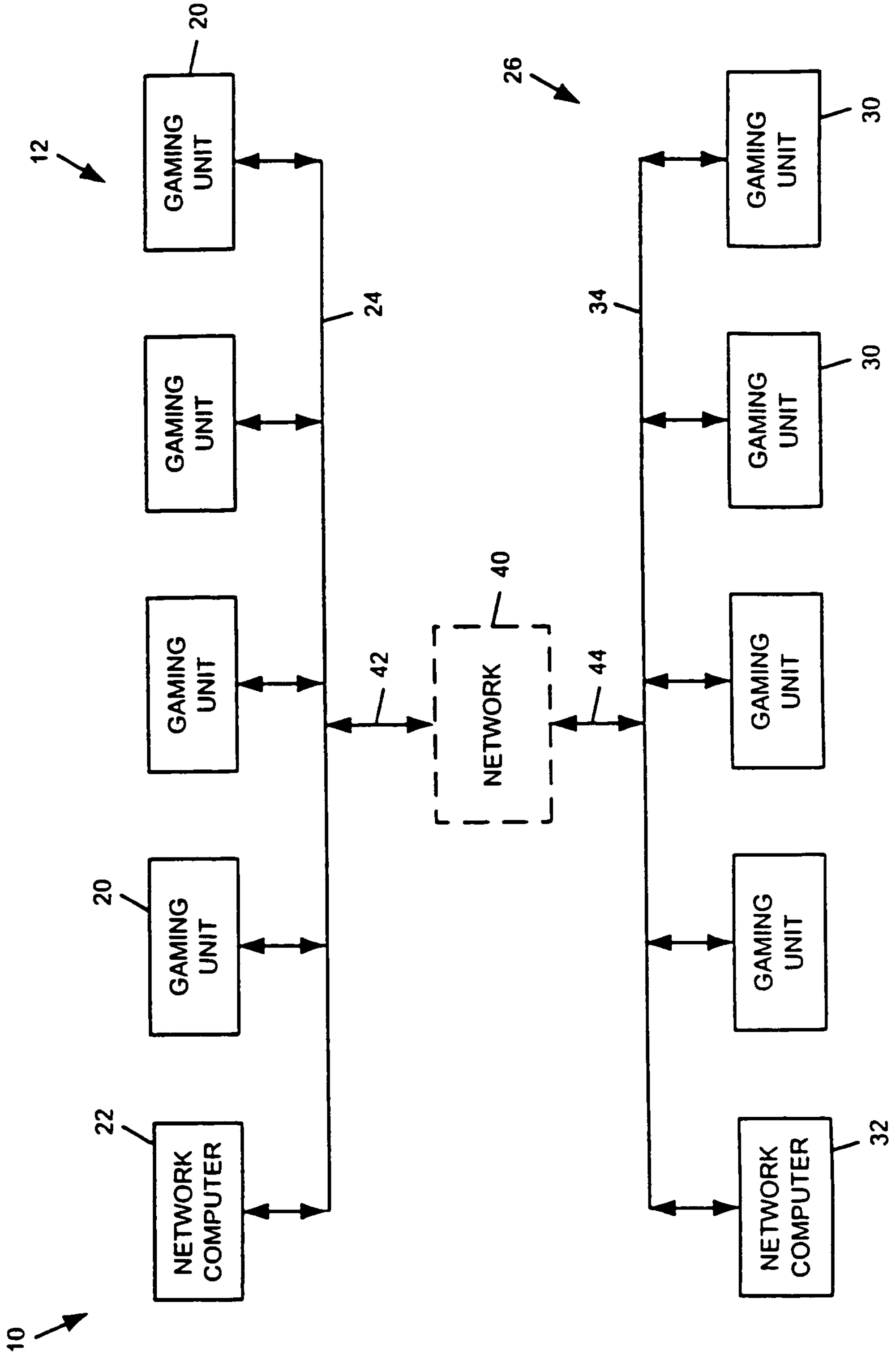
FIG. 1 is a block diagram of an embodiment of a gaming system in accordance with the invention.

FIG. 1 illustrates an embodiment of a gaming system 10 in accordance with the invention. Referring to FIG. 1, the gaming system 10 may include a first group or network 12 of gaming units 20 operatively coupled to a network computer 22 via a network data link or bus 24. The gaming system 10 may include a second group or network 26 of gaming units 30 operatively coupled to a network computer 32 via a network data link or bus 34. The first and second gaming networks 12, 26 may be operatively coupled to each other via a network 40, which may comprise, for example, the Internet, a serial network, a wide area network (WAN), a local area network (LAN), an ethernet network, a firewire based network, and other intranet networks. via a first network link 42 and a second network link 44.

The first network 12 of gaming units 20 may be provided in a first casino or facility, and the second network 26 of gaming units 30 may be provided in a second casino or facility located in a separate geographic location than the first casino or facility. For example, the two facilities may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above. The network computer 32 may be used to initiate an instant bonus game for the players using the gaming units 20, as well as determining a value payout associated with the instant bonus game. This will be described in more detail below.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

It should also be noted that the terms gaming apparatus and gaming unit are intended to be interchangeable. Additionally, the terms are intended to include video lottery terminals. Video lottery terminals operate essentially the same as gaming apparatuses found in state regulated casinos or other facilities, except that they generally use ticket printers to print tickets that can be exchanged for cash payments instead of paying winning amounts through a coin hopper as in conventional gaming apparatuses.

It should also be noted that the terms gaming apparatus and gaming unit are intended to be interchangeable. Additionally, the terms are intended to include video lottery terminals. Video lottery terminals operate essentially the same as gaming apparatuses found in state regulated casinos or other facilities, except that they generally use ticket printers to print tickets that can be exchanged for cash payments instead of paying winning amounts through a coin hopper as in conventional gaming apparatuses.

Figure 2:
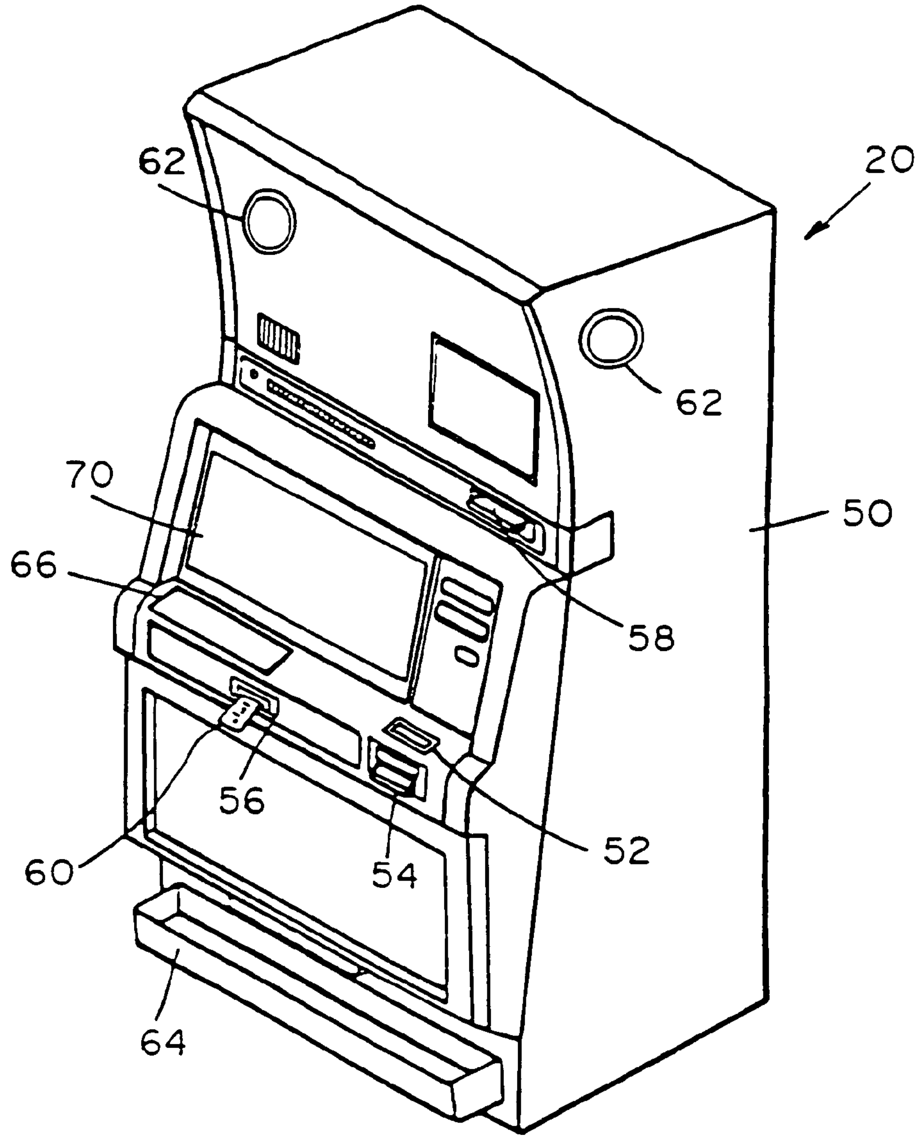
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of gaming unit and may have various different structures and methods of operation. For exemplary purposes, various designs of the gaming units 20 are described below, but it should be understood that numerous other designs may be utilized.

Referring to FIG. 2, the gaming apparatus or unit 20 may include a display support structure 50, which may also be referred to as a housing or cabinet. The display support structure 50 may include one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the facility name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. Other methods known to those skilled in the art could also be used. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and color video display units 70 and 71 for displaying images relating to the game or games provided by the gaming unit 20. The audio speakers 62 may generate audio representing sounds such as the noise of spinning slot machine reels, a dealer's voice, music, announcements or any other audio. The gaming apparatus may include a plurality of mechanically rotatably reels, wherein each of the plurality of mechanical reels have a plurality of symbols or images formed thereon. Each of the mechanically rotatably reels may be independently rotatable. The gaming apparatus may further include a transparent display member disposed in the housing 50 so that the images formed on the reels are visible to a player. The input control panel 66 may be provided with a plurality of pushbuttons or touch-sensitive areas that may be pressed by a player to select games, make wagers, make gaming decisions, etc.

The gaming unit 20 may function as a mechanical slots gaming apparatus, wherein the mechanical slots gaming apparatus may replace the color video display 70 with a transparent display portion in the housing 50 that allows viewing of a plurality of mechanically rotatable reels. Each of the mechanical reels may be independently rotatable about an axis and may have a plurality of slot machine symbols formed on a surface of the mechanical reels. The mechanical reels may be disposed within the housing so that the slot machine symbols are visible to a player through the transparent display portion. If a plurality of mechanically rotatable reels replace the video display 70, the video display 71 could be used to display video images associated with an instant bonus game.

Figure 2A:
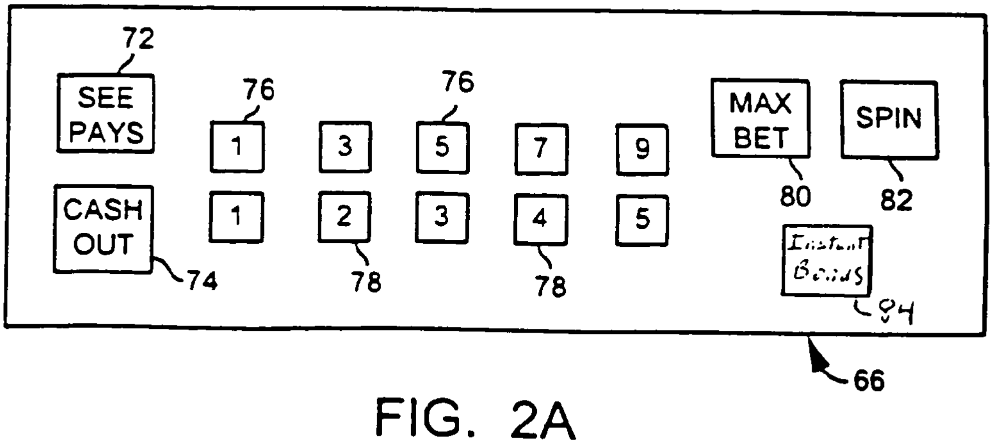
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" (i.e. video) reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5", button 76 (meaning that five paylines were to be played on the next spin of the reels) and then activate the "3" button 78 (meaning that three coins per payline were to be wagered), the total wager would be $3.75 (assuming the denomination was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made. The control panel 66 may further include an instant bonus game button 84 to allow the player to buy and play an instant bonus game.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
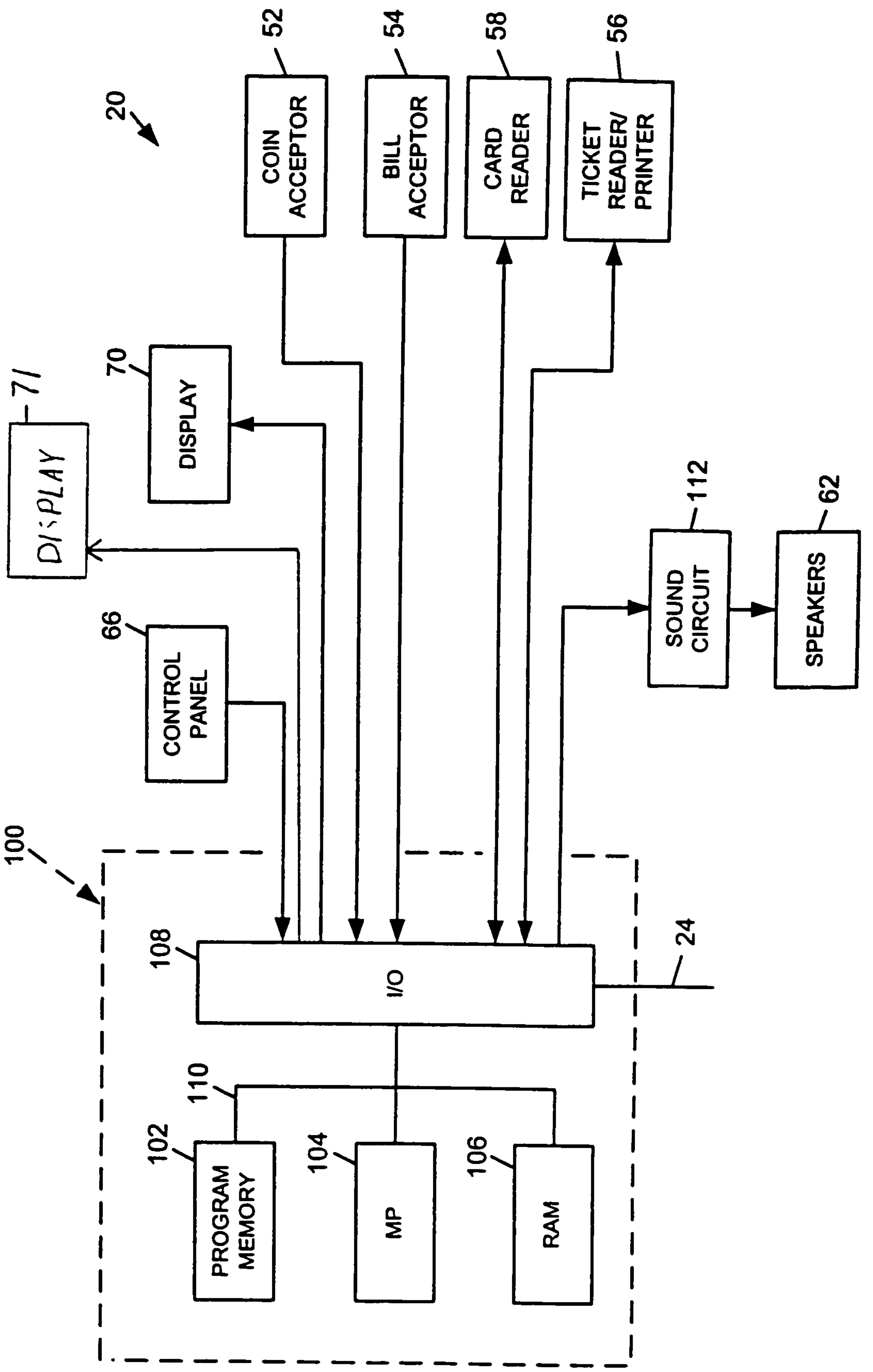
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example. Also, multiple controllers may be present within the gaming apparatus 20 to control different components.

FIG. 3 illustrates that the control panel 66, the coin acceptor 52, the bill acceptor 54, the card reader 58, the ticket reader/printer 56, and the display units 70 and 71 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108. Additionally, if the gaming unit 20 functions as a mechanical slots gaming apparatus having a plurality of mechanical reels, then the controller may be connected to the mechanical reels or to sensors that indicate the positions of the reels.

As shown in FIG. 3, the components 52, 54, 56, 58, 66, 70, 71, and 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. For example, the network computers 22, 32 could be used to control an instant bonus game for players of the gaming units 20. The computer program portions may be written in any high level language such as C, C++ or the like or any low-level, assembly or machine language. By storing the computer program portions therein, various portions of the memories 102, 106 are physically and/or structurally configured in accordance with computer program instructions.

Figure 4:
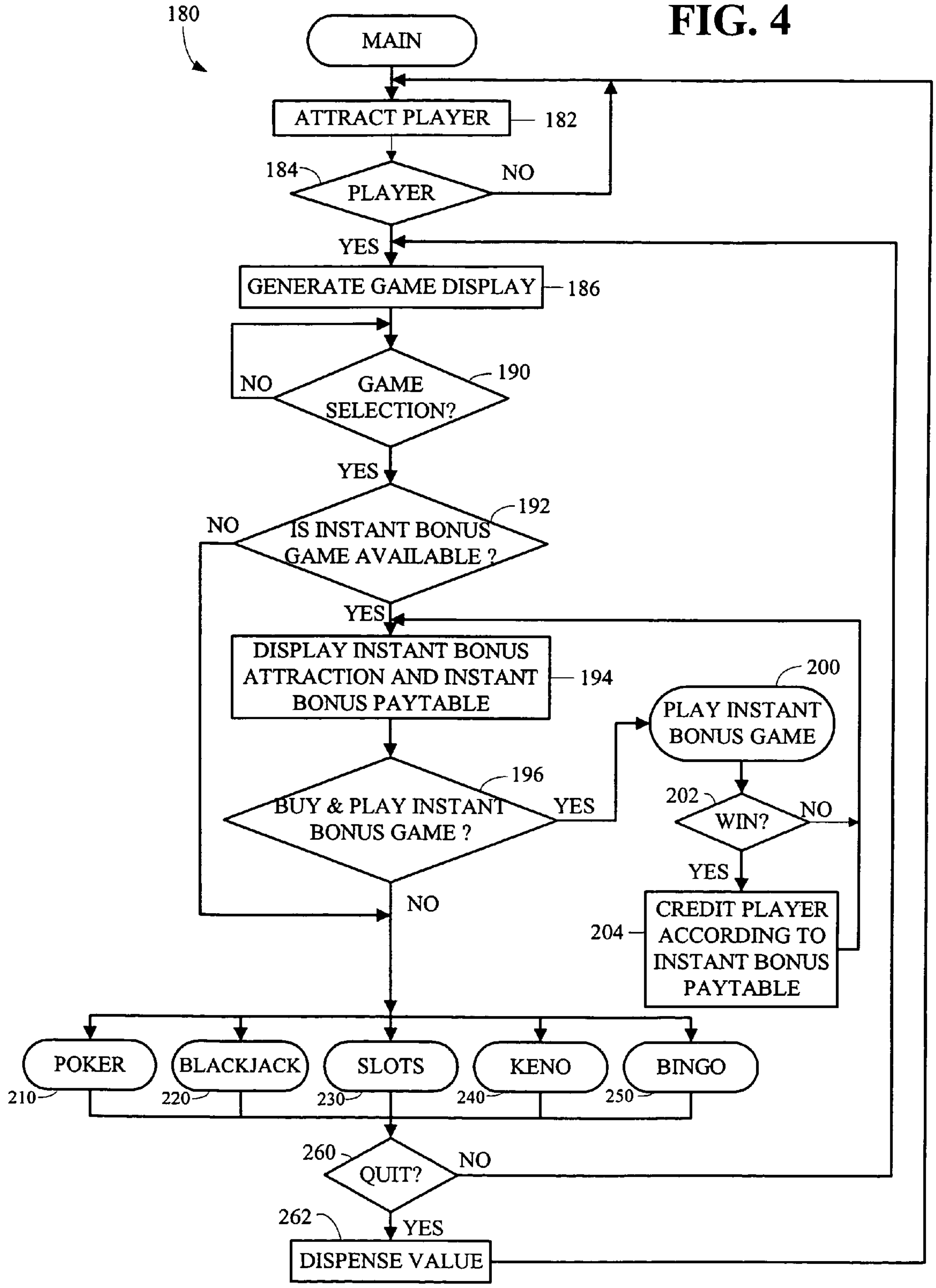
FIG. 4 is a flowchart of an embodiment of a main routine that may be performed during operation of one or more of the gaming units.

FIG. 4 is a flowchart of a main operating routine 180 that may be stored in the memory of the controller 100. Referring to FIG. 4, the main routine 180 may begin operation at block 182 during which an attraction sequence may be performed in an attempt to induce a potential player in a casino or other facility to play the gaming unit 20. The attraction sequence may be performed by displaying one or more video images on the display unit 70 and/or causing one or more sound segments, such as voice or music, to be generated via the speakers 62. The attraction sequence may include a scrolling list of standard games that may be played on the gaming unit 20 and/or video images of various games being played, such as video poker, video blackjack, video slots, video keno, video bingo, video pachinko, etc.

During performance of the attraction sequence, if a potential player makes any input to the gaming unit 20 as determined at a block 184, the attraction sequence may be terminated and a game-selection display may be generated on the display unit 70 at block 186 to allow the player to select a game available on the gaming unit 20. The gaming unit 20 may detect an input at block 184 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 186 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 190, the controller 100 may determine at a block 192 if an instant bonus game is available. If an instant bonus game is available, the controller 100 may generate an instant bonus attraction and display the instant bonus attraction and an instant bonus paytable at a block 194 on either of the video display units 70 or 71. Those skilled in the art will appreciate that the network computer 32 could be used to initiate and facilitate the display of the instant bonus game. Additionally, the video image of the instant bonus attraction and the instant bonus paytable may be a separate video image from the first video image of the standard game that was selected by the player, or the video image of the instant bonus attraction and the instant bonus paytable may simply comprise a portion of the first video image of the standard game selected by the player. In other words, the two video images of the standard game selected by the player and the instant bonus game may be displayed simultaneously on the display 70, or one video image could be displayed on the display 70 and the other video image could be displayed on the display 71.

The instant bonus attraction may be performed in an attempt to induce a player to buy outright a bonus game, before playing a standard game. In other words, a player is given the opportunity to play the bonus game, for a fee, without having to "earn" the bonus game through successful play(s) of the standard game. Therefore, a player is provided the ability to play the instant bonus game whenever he or she desires. The instant bonus game may be considered similar to a lottery because all players are given the option to pay money to play the bonus game. The paytable associated with the instant bonus game may be different from a paytable for the bonus game where the player "earned" the bonus game as a result of a successful play of a standard game, or a series of successful plays of a standard game. For example, the controller 100 may establish a $10 minimum to buy the instant bonus game, and the payout for winning the purchased instant bonus game with the $10 wager would be $100. Winning the same bonus game in a situation where the player "earned" the bonus game after successful play of the standard game could result in a $1000 payout for an identical $10 wager. It should also be noted that the controller 100 may set different minimum wagers or buy-in amounts for a purchased instant bonus game and an "earned" bonus game. Additionally, the paytable for the instant bonus game may be configured so that a minimum jackpot value is set, and that minimum jackpot value is displayed on the display 70, or any other display device, for viewing by the player.

Several variations to the paytable and associated payouts described above for the instant bonus game could be implemented. For example, the gaming system 10 could be offered on a plurality of gaming apparatuses, wherein the gaming system 10 would control the timing of an instant bonus game so that a plurality of players could compete for the bonus. The ability to have multiple players playing for the same bonus game could be as simple as allowing a small group of friends to compete against each other, or as sophisticated as having a very large number of players competing for a large jackpot. For games having very large jackpots, the gaming system 10 may contribute monitarily to the jackpot for the instant bonus game. Additionally, the instant bonus game may be extended to include progressive jackpots where the jackpot is advertised in advance. For instant bonus games associated with wide area progressive jackpots, the timing of the jackpot could be scheduled at a predictable time which may also be included in an advertisement.

The gaming system 10 may further notify all of the players competing for the instant bonus jackpot of the current jackpot amount. The payout for an instant bonus game may thus comprise a contribution from the operator of the gaming system 10 as well as a percentage of all of the amounts wagered by the plurality of players playing the bonus game. The controllers for the gaming apparatusses in the gaming system 10 may update and display for the players the current value of the instant bonus jackpot as additional wagers are made, or the network computer 32 could be used for this. It should also be noted that the host facility or an operator of the gaming system 10 may control the timing of the instant bonus game through the network computer 32. The operator's control of the instant bonus game may be supplemented by, or replaced by, the controllers in the gaming system 10.

Referring again to the routine 180 of FIG. 4, if the controller determines at a block 196 that the player wishes to buy and play an instant bonus game, the controller 100 may display the instant bonus game on the display 70 and allow the player to play the instant bonus game at a block 200. The controller 100 may prompt the player to insert value equaling the minimum buy-in amount before allowing the player to play the instant bonus game. At a block 202, the controller may determine if the player won the instant bonus game. If the player did not win the instant bonus game, then the routine 180 may return to the block 194 where the controller may generate the instant bonus attraction. The routine 180 could alternatively take the player directly to one of the game routines 210, 220, 230, 240, or 250, if the player did not win the instant bonus game. If the player won the instant bonus game, the player may be credited according to the instant bonus paytable at a block 204. The routine 180 may then return to the block 194 where the instant bonus attraction may be generated and displayed.

If the gaming apparatus 20 does not have an instant bonus game available, or if the player chooses not to buy and play the instant bonus game when it is available, upon selection of one of the standard games by the player, the controller 100 may cause one of a number of standard game routines to be performed to allow the selected game to be played. For example, the standard game routines could include a video poker routine 210, a video blackjack routine 220, a slots routine 230, a video keno routine 240, a video bingo routine 250, and a video pachinko routine (not shown). At a block 260, if no game selection is made within a given period of time, the operation may branch back to block 186.

After one of the routines 210, 220, 230, 240, 250 has been performed to allow the player to play one of the standard games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 182. If the player did not wish to quit as determined at block 260, the routine may return to block 186 where the game-selection display may again be generated to allow the player to select another game.

An alternative configuration for the controller 100 could include revising the routine 180 so that a user is taken directly to one of the games 210, 220, 230, 240 or 250 after playing the instant bonus game at the block 200. This could occur only if the player wins the instant bonus game, only if the player loses the instant bonus game, or regardless of whether the player wins or loses the instant bonus game. Yet another alternative configuration could include taking the player to the block 260 after playing the instant bonus game to allow the player to quit immediately after playing the instant bonus game. As with the alternative described above, this could occur only if the player wins the instant bonus game, only if the player loses the instant bonus game, or regardless of whether the player wins or loses the instant bonus game.

It should be noted that although five standard gaming routines are shown in FIG. 4, a different number of routines could be included to allow play of a different number of games. The gaming unit 20 may also be programmed to allow play of different games. Likewise, the instant bonus game described above may be the same bonus game for all of the standard games, or it may be different for each of the standard games selected. It is also possible to have multiple instant bonus games available for each of the standard games, or for a group of the standard games.

Figure 5:
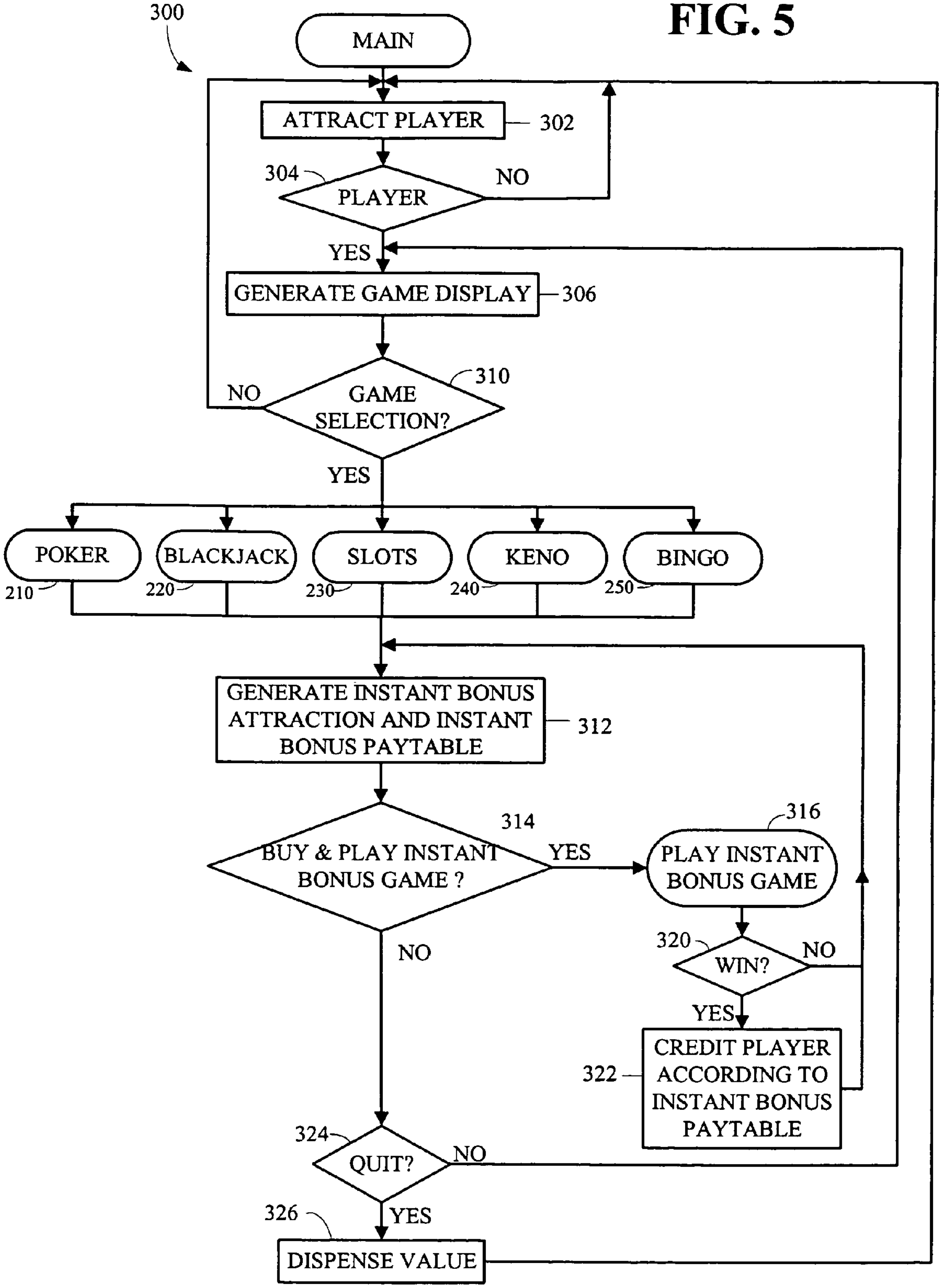
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 and is similar to the routine 180 of FIG. 4 except that the instant bonus game is assumed available on all gaming apparatusses 20 is made available to the player after the player plays one of the standard games.

Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display units 70 and 71 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of a standard casino game that may be played on the gaming unit 20 and/or a visual message to prompt the player to deposit value into the gaming unit 20. Block 310 may be used to determine if the player requested initiation of a game, in which case the controller 100 may cause one of a number of game routines to be performed to allow the selected game to be played. For example, the standard game routines could include a video poker routine 210, a video blackjack routine 220, a slots routine 230, a video keno routine 240, a video bingo routine 250, and a video pachinko routine (not shown). At the block 310, if no game selection is made within a given period of time, the operation may branch back to block 302.

After one of the standard game routines 210, 220, 230, 240, or 250 has been completed, the controller 100 may generate and display an instant bonus attraction at a block 312. As with the routine 180 from FIG. 4, the instant bonus attraction may be performed in an attempt to induce a player to buy outright a bonus game. As described above, the instant bonus game may be initiated by the gaming apparatus' controller 100 or the network computer's controller. The instant bonus attraction may be generated regardless of the outcome of the standard game, so that a player is provided the opportunity to play the bonus game even after losing the standard game. The controller 100 may also display a paytable for the bonus game at the block 312. The paytable data may be transmitted to the controller 100 from the network computer 22 via the network 40 and stored in the memory 102. The paytable and the minimum wager may vary depending on whether the bonus game was "earned" or "bought." For example, the minimum wager for a bonus game that is "earned" could be very low, if not free, and "earned" bonus games that are won could at the same time offer very large payouts. But, for instant bonus games that are "bought," the minimum wager could be higher than the minimum wager required for "earned" bonus games, and at the same time, winning a "bought" instant bonus game could payout a smaller sum than winning an "earned" bonus game.

A block 314 in the routine 300 may determine whether or not a player wants to buy and play the instant bonus game. After a player has decided to play the instant bonus game and has deposited value into the gaming unit 20, the player is allowed to play the instant bonus game at a block 316. After the routine 300 has been performed to allow the player to play the instant bonus game, a block 320 may be utilized to determine whether the player won the instant bonus game. If the player did not win the instant bonus game, the routine may return to the block 312 where the instant bonus attraction is again generated. Alternatively, the routine may advance the player to a block 324 where the player is given the option to quit the routine. If the player won the instant bonus game, the player may be credited according to the instant bonus paytable at a block 322, where the routine may then return to the block 312. The information representing the value payout associated with a winning instant bonus game may be transmitted from the network computer 22 to the memory 102 of the controller 100.

If the player does not want to play the bonus game (or an additional bonus game if he or she has already played one or more bonus games), a block 324 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 326 based on the outcome of the game(s) played by the player. The operation may then return to block 302. If the player did not wish to quit as determined at block 324, the operation may return to block 306.

Video Poker

Figure 6:
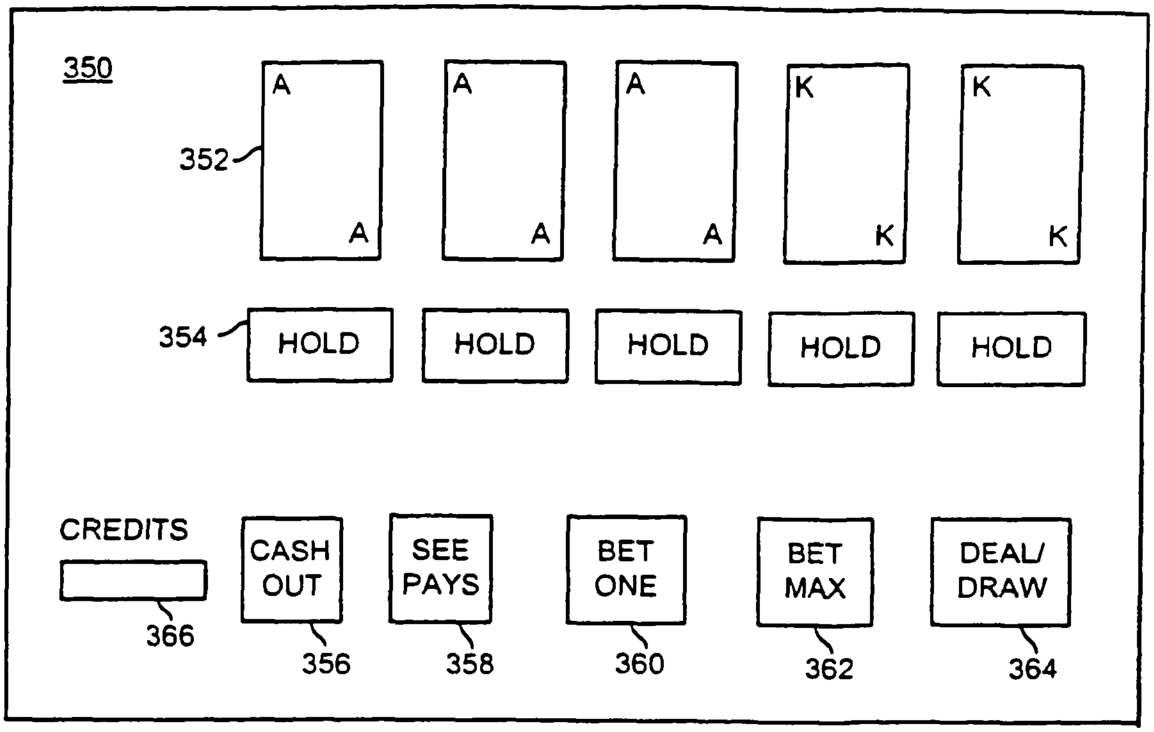
FIG. 6 is an illustration of an embodiment of a visual display that may be displayed during performance of the video poker routine of FIG. 8.

FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
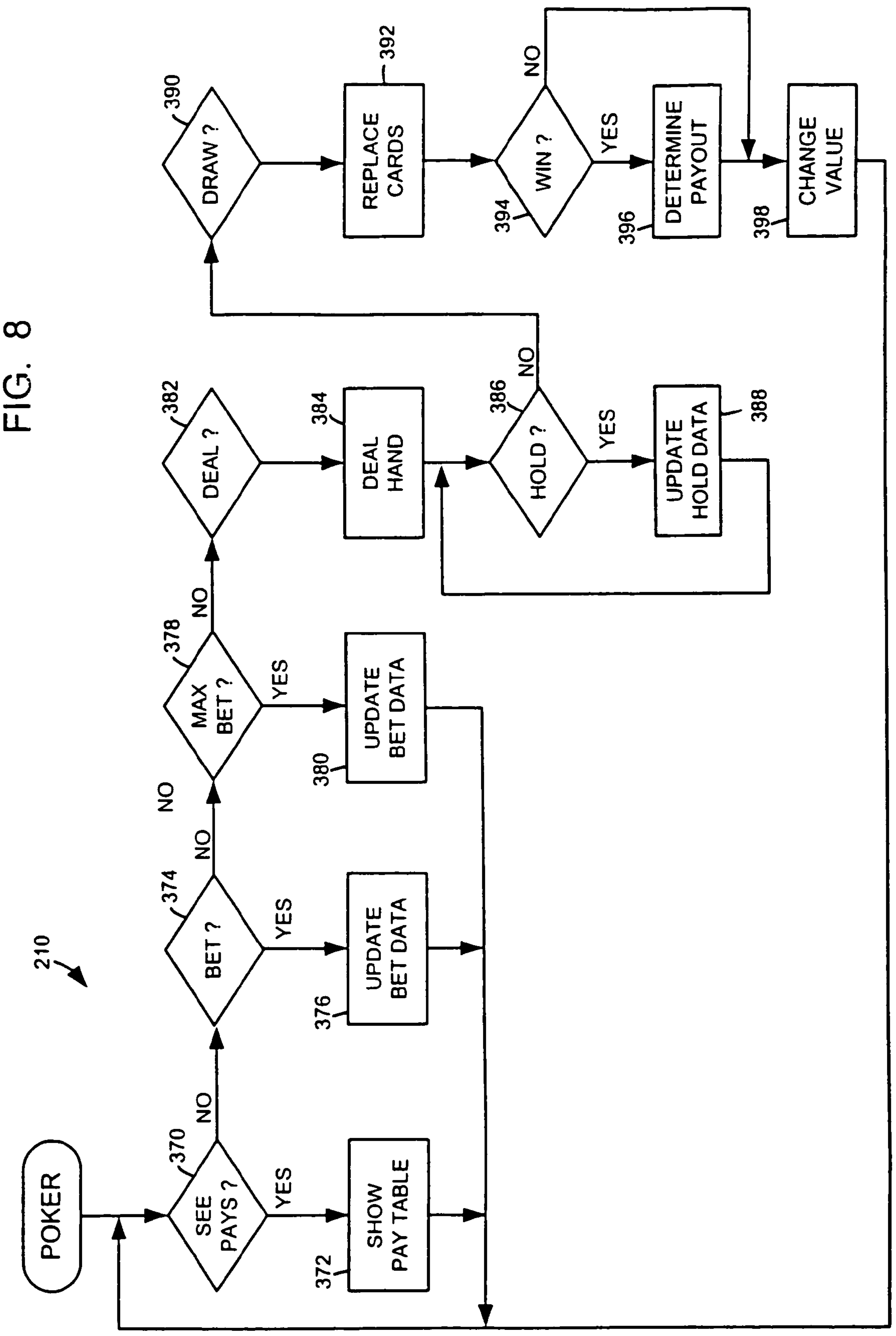
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
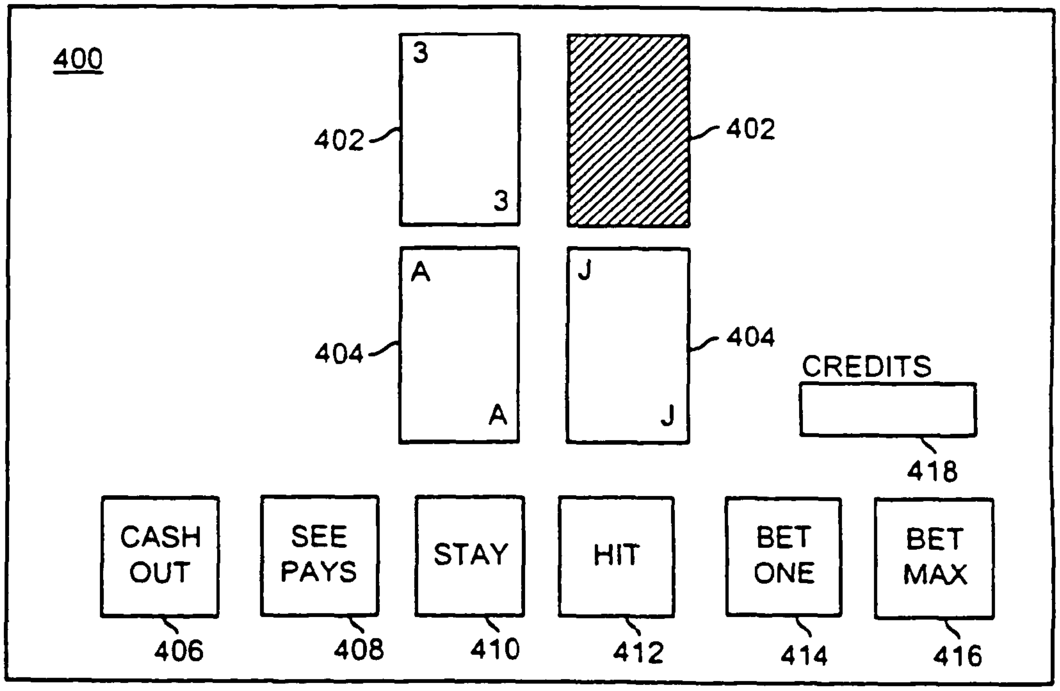
FIG. 7 is an illustration of an embodiment of a visual display that may be displayed during performance of the video blackjack routine of FIG. 9.

FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 9:
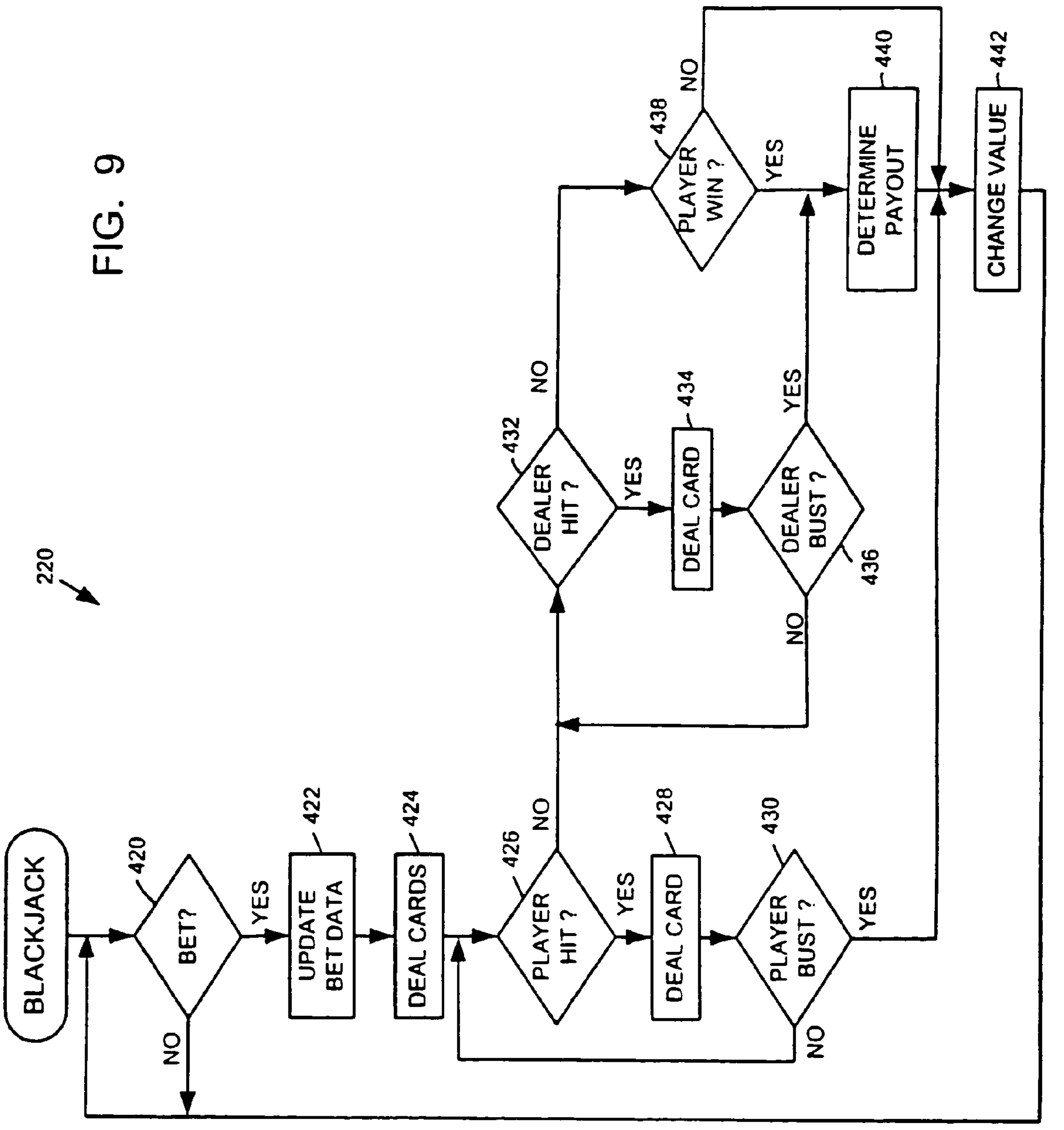
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 7).

Slots

FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
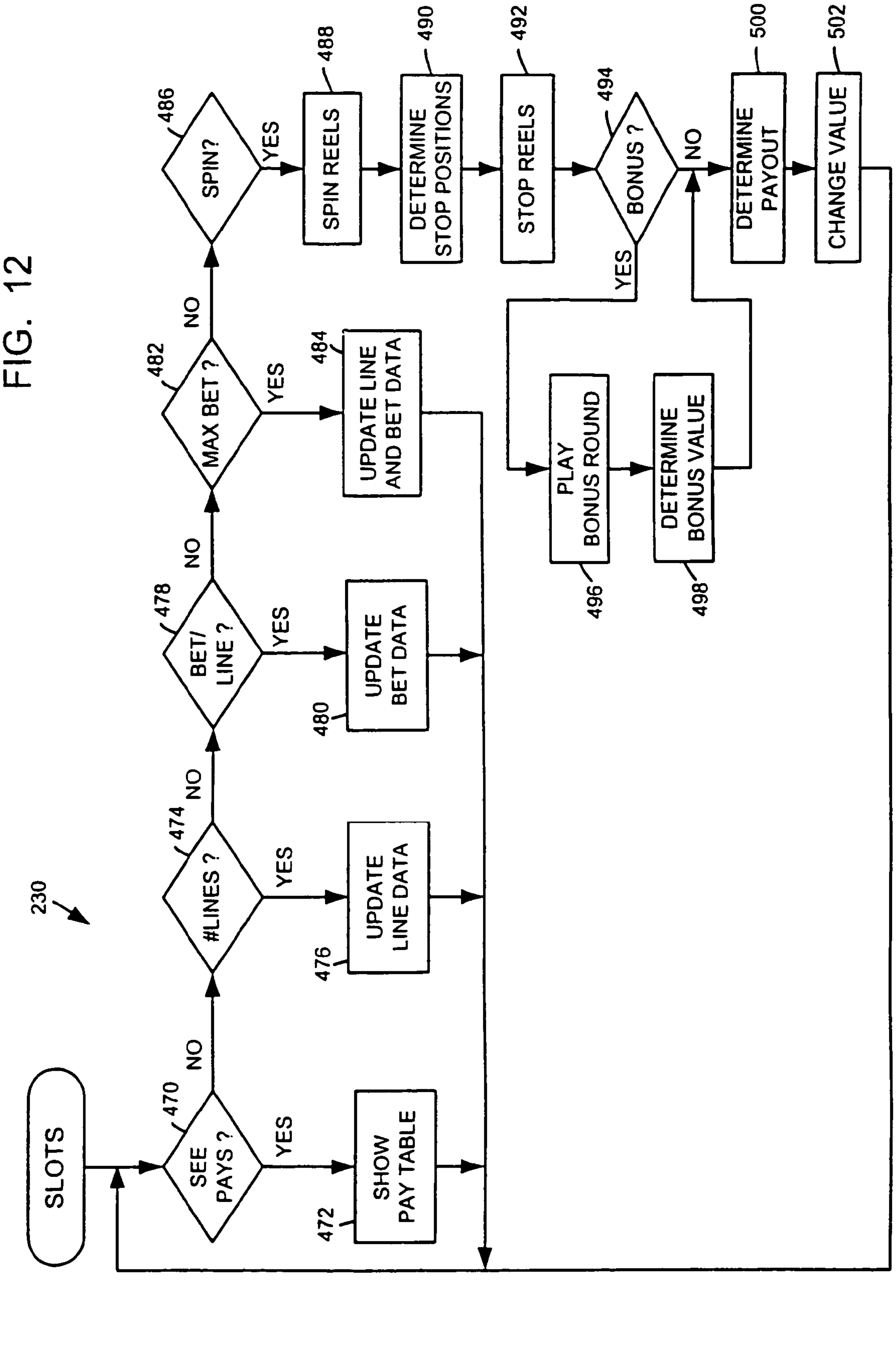
FIG. 12 is a flowchart of an embodiment of a slots routine that may be performed by one or more of the gaming units.

FIG. 12 is a flowchart of the slots routine 230 shown schematically in FIG. 4. Referring to FIG. 12, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
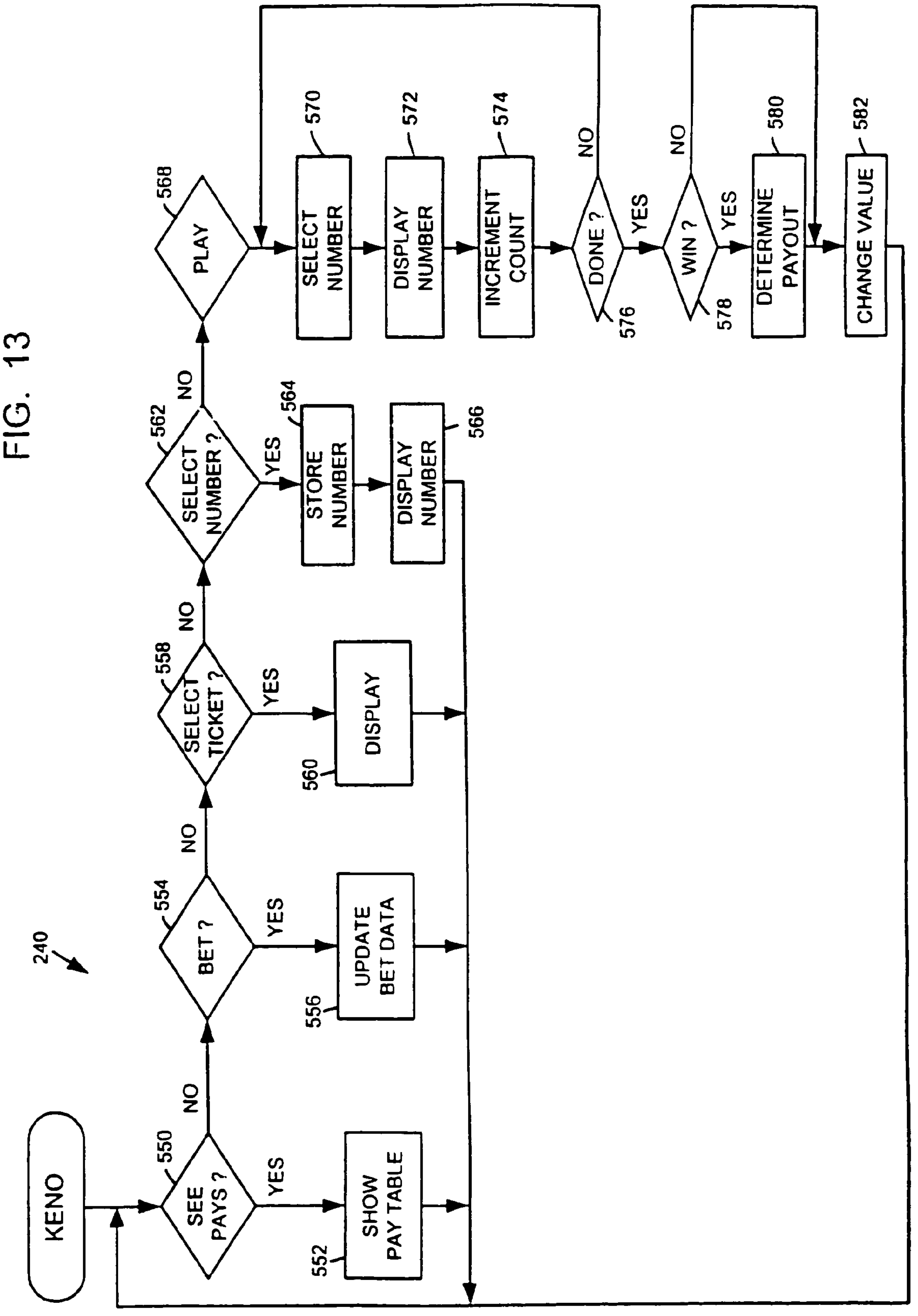
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13 at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Video Bingo

Figure 14:
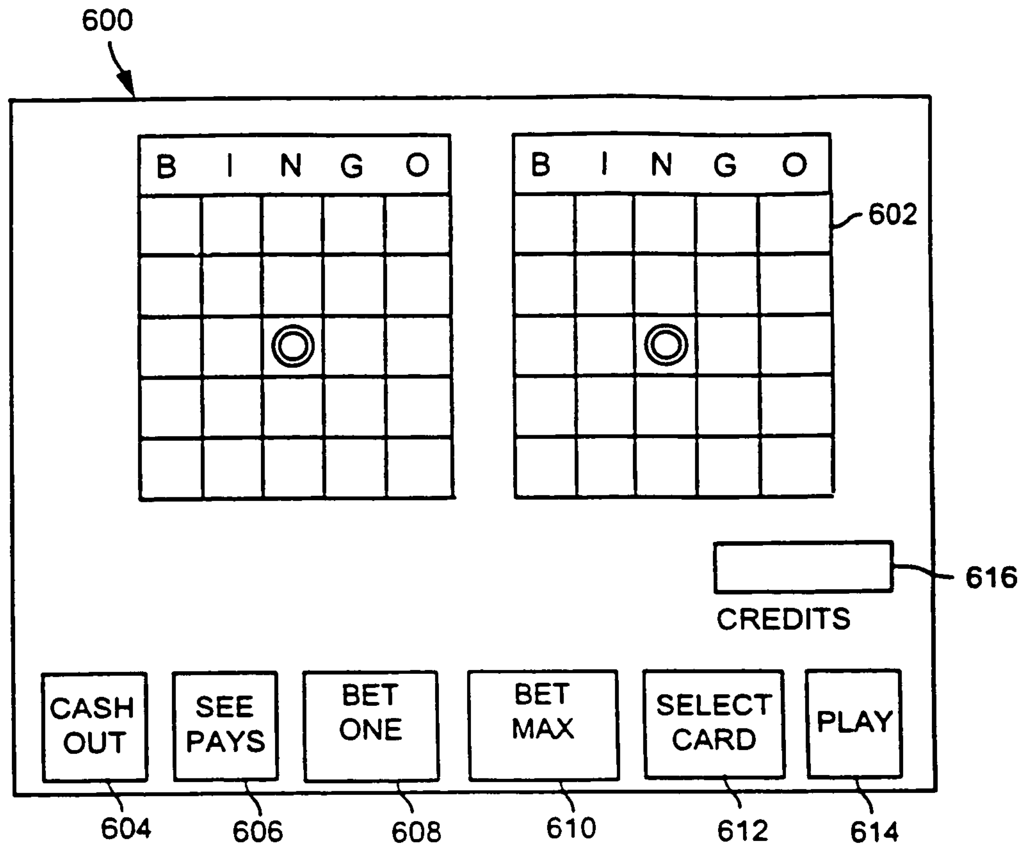
FIG. 14 is an illustration of an embodiment of a visual display that may be displayed during performance of the video bingo routine of FIG. 15.

FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 15:
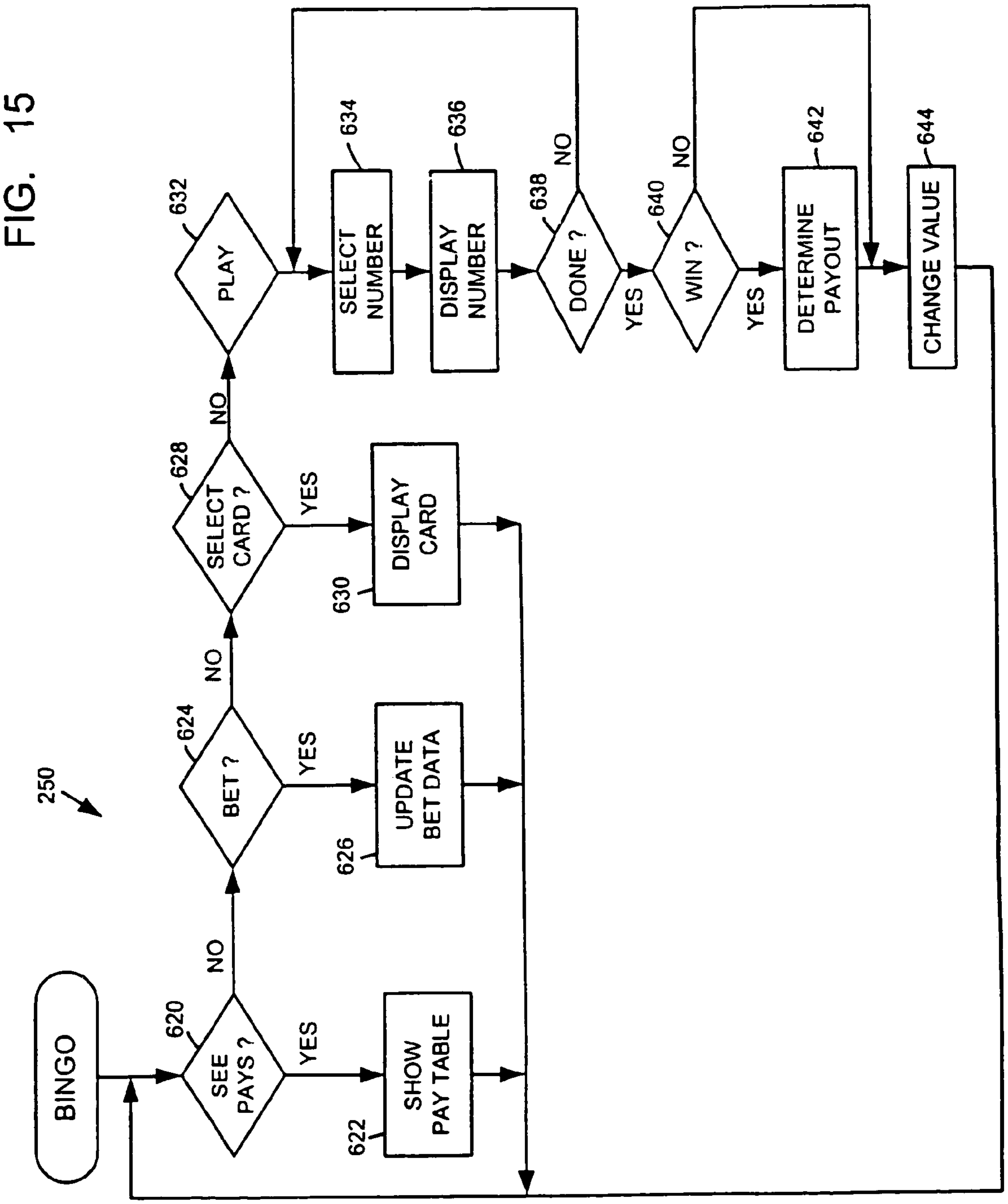
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

The invention claimed is:

1. A computerized gaming method operated by a gaming machine comprising:

causing a first video image to be generated on a display associated with a gaming machine using one or more processors of said gaming machine, said first video image representing a first game selected from a group of first games consisting of video poker, video blackjack, video slots, video keno and video bingo;

causing a second video image of a second game to be generated on a display associated with a gaming machine using said one or more processors of said gaming machine, said second game comprising an instant bonus game;

allowing said instant bonus game to be purchased for a buy-in amount and played without requiring play of said first game and without first obtaining a win in said first game using said one or more processors of said gaming machine, wherein said instant bonus game is the same whether earned or purchased;

setting odds of winning said instant bonus game, using said one or more processors of said gaming machine, to be the same whether said instant bonus game was earned or purchased; and determining, using said one or more processors of said gaming machine, a value payout associated with said instant bonus game after said instant bonus game is played by a player.

2. The computerized gaming method of claim 1, additionally comprising:

setting a minimum jackpot value for said instant bonus game and displaying said minimum jackpot value using said one or more processors of said gaming machine.

3. The computerized gaming method of claim 1, additionally comprising:

prompting said player to insert value equaling said buy-in amount using said one or more processors of said gaming machine.

4. The computerized gaming method of claim 1, additionally comprising:

notifying said player when said instant bonus game will begin.

5. The computerized gaming method of claim 1, wherein said instant bonus game is offered to a plurality of players in competition for said value payout of said instant bonus game.

6. The computerized gaming method of claim 1, wherein said step of determining said value payout associated with said instant bonus game comprises aggregating, using said one or more processors of said gaming machine, a plurality of buy-in amounts contributed by a plurality of players playing said instant bonus game and a facility contribution amount.

7. The computerized gaming method of claim 1, wherein said instant bonus game may be provided instantly by a network computer.

8. The computerized gaming method of claim 1, further comprising:

performing a first attraction sequence related to said first game using said one or more processors of said gaming machine, wherein said first attraction sequence is performed prior to a start of said first game; and performing a second attraction sequence related to said instant bonus game using said one or more processors of said gaming machine, wherein said second attraction sequence is performed upon completion of said first game and prior to a start of said instant bonus game; and wherein performing a second attraction sequence related to a second game prior to a start of said second game comprises displaying said second attraction sequence and displaying a second game paytable prior to the start of said second game.

9. A computerized gaming method operated by a gaming machine comprising:

performing a first attraction sequence related to a first game using one or more processors of said gaming machine;

causing a first video image to be generated on a display associated with a gaming machine using said one or more processors of said gaming machine, said first video image representing said first game selected from a group of first games consisting of video poker, video blackjack, video slots, video keno and video bingo;

performing a second attraction sequence related to a second game using said one or more processors of said gaming machine;

causing a second video image of said second game to be generated on a display associated with a gaming machine using said one or more processors of said gaming machine, said second game comprising an instant bonus game;

allowing said instant bonus game to be purchased for a buy-in amount and played without requiring play of said first game and without first obtaining a win in said first game using said one or more processors of said gaming machine, wherein said instant bonus game is the same whether earned or purchased;

setting odds of winning said instant bonus game to be the same whether said instant bonus game was earned or purchased using said one or more processors of said gaming machine; and determining, using said one or more processors of said gaming machine, a value payout associated with said instant bonus game after said instant bonus game is played by a player.

10. The computerized gaming method of claim 9, additionally comprising:

setting a minimum jackpot value for said instant bonus game and displaying said minimum jackpot value using said one or more processors of said gaming machine.

11. The computerized gaming method of claim 9, additionally comprising:

prompting said player to insert value equaling said buy-in amount using said one or more processors of said gaming machine.

12. The computerized gaming method of claim 9, additionally comprising:

notifying said player when said instant bonus game will begin.

13. The computerized gaming method of claim 9, wherein said instant bonus game is offered to a plurality of players in competition for said value payout of said instant bonus game.

14. The computerized gaming method of claim 9, wherein said step of determining said value payout associated with said instant bonus game comprises aggregating, using said one or more processors of said gaming machine, a plurality of buy-in amounts contributed by a plurality of players playing said instant bonus game and a facility contribution amount.

15. The computerized gaming method of claim 9, wherein said instant bonus game may be provided instantly by a network computer.

16. The computerized gaming method of claim 9, wherein the paytable associated with the instant bonus game differs in response to whether a player earned or purchased the instant bonus game.

17. The computerized gaming method of claim 1, wherein the paytable associated with the instant bonus game differs in response to whether a player earned or purchased the instant bonus game.

18. The computerized gaming method of claim 9, wherein the second attraction sequence comprises one or more of video images, sound segments and scrolling list of games.

19. A non-transitory computer readable medium comprising instructions, which when implemented by one or more processors perform the following operations:

cause a first video image to be generated, said first video image representing a first game selected from a group of first games consisting of video poker, video blackjack, video slots, video keno and video bingo;

cause a second video image of a second game to be generated, said second game comprising an instant bonus game;

allow said instant bonus game to be purchased for a buy-in amount and played without requiring play of said first game and without first obtaining a win in said first game, wherein said instant bonus game is the same whether earned or purchased;

set odds of winning said instant bonus game to be the same whether said instant bonus game was earned or purchased; and determine a value payout associated with said instant bonus game after said instant bonus game is played by a player.

20. A non-transitory computer readable medium comprising instructions, which when implemented by one or more processors perform the following operations:

perform a first attraction sequence related to a first game;

cause a first video image to be generated, said first video image representing said first game selected from a group of first games consisting of video poker, video blackjack, video slots, video keno and video bingo;

perform a second attraction sequence related to a second game;

cause a second video image of said second game to be generated, said second game comprising an instant bonus game;

allow said instant bonus game to be purchased for a buy-in amount and played without requiring play of said first game and without first obtaining a win in said first game, wherein said instant bonus game is the same whether earned or purchased;

set odds of winning said instant bonus game to be the same whether said instant bonus game was earned or purchased; and determine a value payout associated with said instant bonus game after said instant bonus game is played by a player.

* * * * *